(12) United States Patent
Kalaboukis

(10) Patent No.: US 8,055,552 B2
(45) Date of Patent: Nov. 8, 2011

(54) SOCIAL NETWORK COMMERCE MODEL

(75) Inventor: Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1122 days.

(21) Appl. No.: 11/615,574

(22) Filed: Dec. 22, 2006

(65) Prior Publication Data
US 2008/0154739 A1 Jun. 26, 2008

(51) Int. Cl.
*G06Q 30/00* (2006.01)
(52) U.S. Cl. ........ 705/26.25; 705/1; 705/10; 705/14.51; 705/14.61; 705/14.67; 705/26.1; 705/26; 705/27; 726/26; 707/6; 707/E17.026; 707/E17.009
(58) Field of Classification Search ........... 705/1, 14.51, 705/14.61, 14.67, 26, 27, 10, 26.1, 26.25; 707/6, E17.026, E17.009; 726/26
See application file for complete search history.

(56) References Cited

U.S. PATENT DOCUMENTS

| | | | | |
|---|---|---|---|---|
| 2003/0014272 A1* | 1/2003 | Goulet et al. | ..................... | 705/1 |
| 2003/0163724 A1* | 8/2003 | Tayebi et al. | ................. | 713/200 |
| 2004/0199923 A1* | 10/2004 | Russek | .......................... | 719/310 |
| 2006/0229950 A1* | 10/2006 | Pabbisetty et al. | .............. | 705/26 |
| 2006/0282309 A1* | 12/2006 | Zhang et al. | ..................... | 705/14 |
| 2007/0233677 A1* | 10/2007 | Facciorusso et al. | ............. | 707/6 |
| 2008/0172314 A1* | 7/2008 | Hahn-Carlson | ................. | 705/35 |

* cited by examiner

*Primary Examiner* — Yogesh C Garg
(74) *Attorney, Agent, or Firm* — James J. DeCarlo; Greenberg Traurig, LLP

(57) ABSTRACT

Rules-based commerce system or marketplace that proactively acquires and purchases, on behalf of consumers, works submitted by creators. In one implementation, the system involves a rules engine which makes current and future purchases of electronic content and code based on the positive fulfillment of specific pre-created criteria. Some particular implementations of the invention can be implemented to create a net of income from a large quantity of sources in order to support one or more social media activities. Other implementations of the invention can be configured to create forms of sponsorship whereby a consumer can create rules to automatically acquire and pay for a future work that meets one or more criteria. On the creator side, implementations of the invention can be configured to assist creators to develop an audience and corresponding income streams to support social media creation activities.

19 Claims, 6 Drawing Sheets

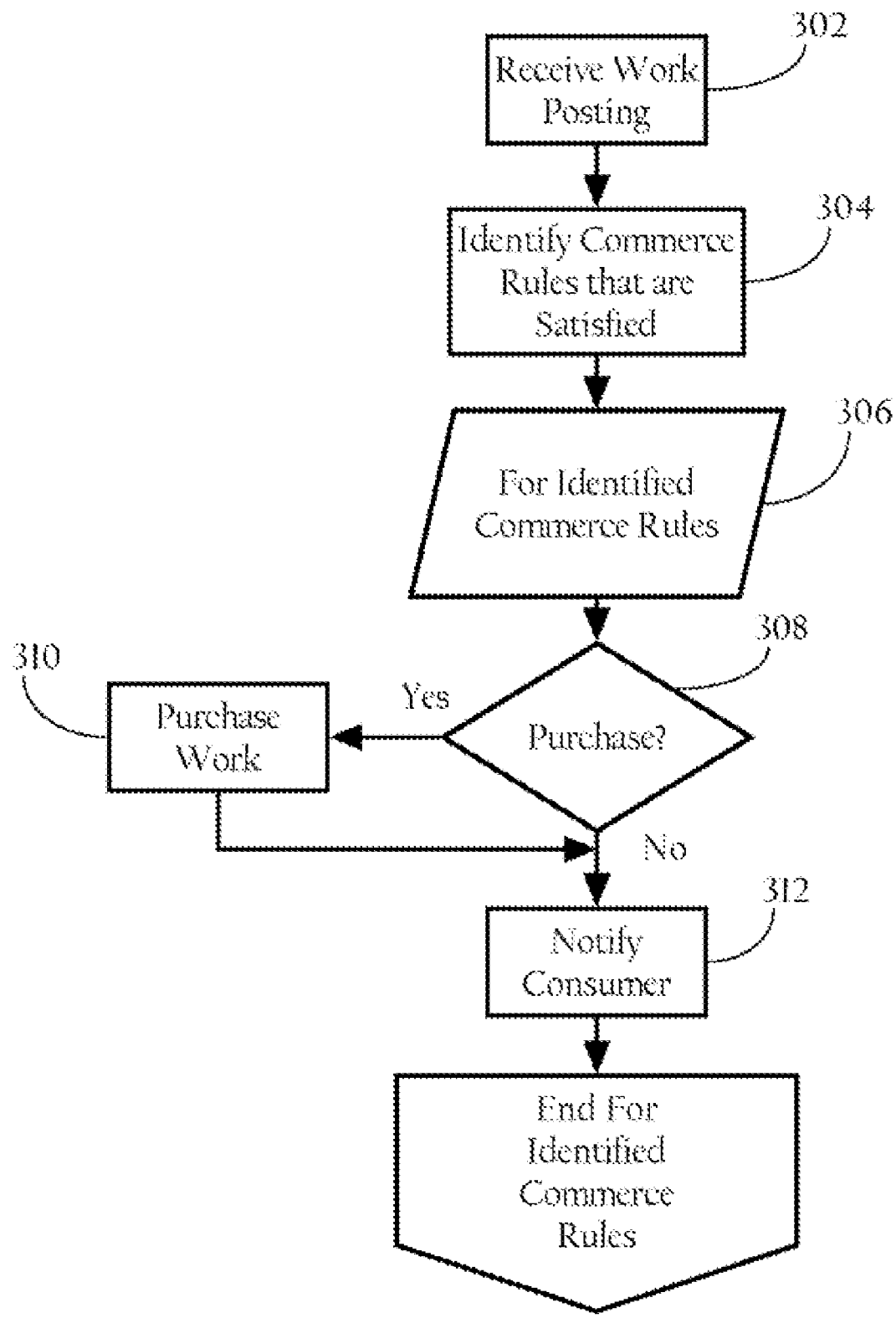
Fig._6

US 8,055,552 B2

SOCIAL NETWORK COMMERCE MODEL

TECHNICAL FIELD

The present disclosure relates generally to network-based commerce models.

BACKGROUND OF THE INVENTION

Interactive systems connected wide area networks, such as the Internet, have steadily evolved into vibrant mediums for social interaction and distribution of media and other content. Indeed, an enormous amount of digital media generated by end users, media companies, and professional media creators is made available and shared across the Internet through web sites and uploading to various content hosting or aggregation systems and services (e.g., Flickr®, Yahoo!® Video, YouTube.com, etc.). End-users increasingly use or share media in a variety of on-line and interactive contexts. For example, an ever-increasing number of end-users create websites of various types, including blog pages, personalized social networking pages (such as Yahoo! 360, Facebook, or MySpace), that utilize digital media content, such as images, video, and music.

Today, most people who blog, podcast, write open source software and make available other useful content and intellectual property over a computer network to the community do not get paid enough from these endeavors in order to spend the maximum amount of their time on them. In other words, these people need to maintain a day job or have other income sources in order to pursue their creative passions. While there are marketplaces in existence today which allow for the sale and exchange of electronic goods and services, there are no network marketplaces or commerce models that facilitate commerce in social media contexts.

SUMMARY

The present invention is directed to social network commerce models. Particular implementations of the invention provide rules-based commerce system or marketplace that proactively acquires and purchases, on behalf of consumers, works submitted by creators. In one implementation, the system involves a rules engine which makes current and future purchases of electronic content and code based on the positive fulfillment of specific pre-created criteria. Some particular implementations of the invention can be implemented to create a net of income from a large quantity of sources in order to support one or more social media activities. Other implementations of the invention can be configured to create forms of sponsorship whereby a consumer can create rules to automatically acquire and pay for a future work that meets one or more criteria. On the creator side, implementations of the invention can be configured to assist creators to develop an audience and corresponding income streams to support social media creation activities.

DESCRIPTION OF THE DRAWINGS

FIGS. 4, 5 and 6 are flow charts illustrating process flows, according to one implementation of the invention, directed to the social media commerce models disclosed herein.

DESCRIPTION OF EXAMPLE EMBODIMENT(S)

A. Overview

Particular implementations of the invention are directed to network-based commerce models operative in social networking contexts. In one particular implementation, the invention involves one or more of the following operations. A user registers with a marketplace system that allows the user to search for electronic content to purchase, such as source code, object code, a podcast, a blog post, a video file, and the like. If the user cannot find what she is looking for specifically, she can post a request for a particular type of content to be produced and set a price for that content. In addition, a user may also search or navigate through creator profiles and subscribe to a person, their work, or a type of work. For example, a user may wish to purchase any music videos directed to at politics. In one implementation, the marketplace system allows the user to create one or more commerce rules such that the system would provide any current videos and automatically deliver any new videos which will have been created, while the rule is in effect. The rule-based marketplace creates a proactive content acquisition and payment system that automatically acquires and pays for works that meet pre-defined criteria.

Still further, this same user may also have digital content or objects to trade. The marketplace system, in one implementation, allows the user to post items to trade for other digital content or objects. Furthermore, if the user has one or more works to sell, she may create pointers to their work which reside on other sites and assign monetary or item value to the works. For example, a blogger can charge a micropayment for each view of a blog post, or a monthly fee for access to the blog post, or apply that view value to an item that she wishes to purchase. In another example, a podcaster sets up a podcast on the system and asks for a penny per download. This penny can come from the listener, an advertiser, or a sponsor. For example, the marketplace system 20 can enable a benefactor who pays a podcaster a penny every time someone else downloads a podcast, or an advertiser who pays a podcaster a penny every time someone else downloads a podcast. These and other types of rules-based commerce can be enabled by the marketplace system and processes described herein.

A.1. Example Network Environment

Particular implementations of the invention operate in a wide area network environment, such as the Internet, including multiple network addressable systems. Network cloud 60 generally represents one or more interconnected networks, over winch the systems and hosts described herein can communicate. Network cloud 60 may include packet-based wide area networks (such as the Internet), private networks, wireless networks, satellite networks, cellular networks, paging networks, and the like.

Figure 1:
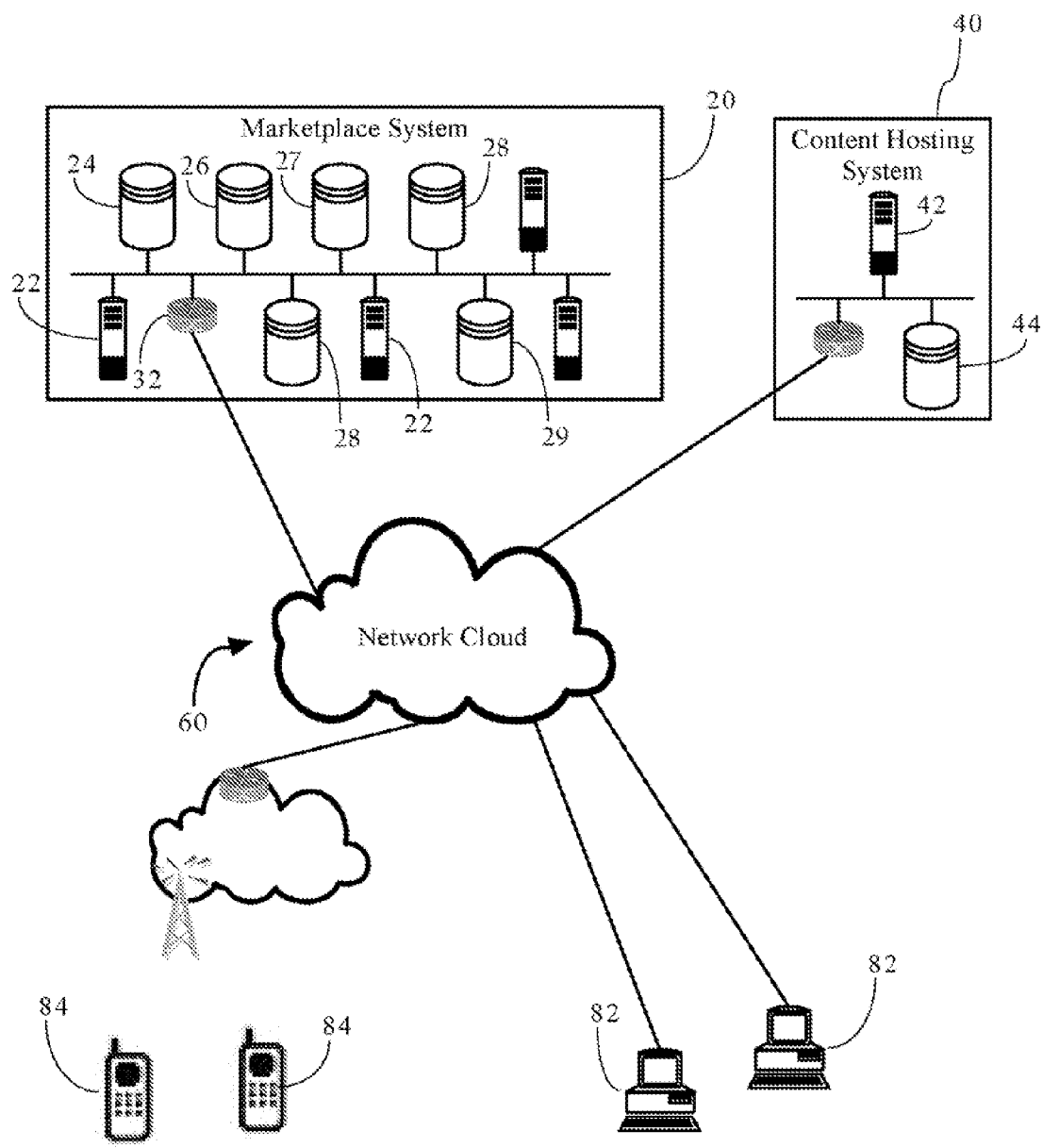
FIG. 1 illustrates an example network environment in which particular implementations may operate.

As FIG. 1 illustrates, a particular implementation of the invention can operate in a network environment comprising marketplace system 20, and content hosting site 40. Although FIG. 1 illustrates the foregoing systems as separate systems, the functionality represented by each system may be combined into other systems. Furthermore, the functionality represented by each depicted system may be further separated. Still further, implementations of the invention may operate in network environments that include multiples of one or more of the individual systems and sites disclosed herein. In addition, other implementations may operate in network environments where one or more of the systems described herein have been omitted. Client nodes 82, 84 are operably connected to the network environment via a network service provider or any other suitable means.

A.1.a. Marketplace System

Marketplace system 20 is a network addressable system that hosts functionality directed to the inventive rules-based commerce models described herein. Marketplace system 20, in one implementation, comprises one or more physical servers 22 and one or more data stores 26, 27, 28 and 29. The one or more physical servers 22 are operably connected to computer network 60 via a router 26. The one or more physical servers 22 host functionality, implemented by one or more server modules, that is operative to support one or more process flows directed to, for example, registering users, receiving works, configuring commerce rules, executing rules-based content acquisition and payment flows, and the like. In one implementation, the functionality hosted by the one or more physical servers may include web or HTTP servers, FTP servers, and the like. In some implementations of the invention, the one or more physical servers 22 are accessible to remote systems as a web service, using Simple Object Access Protocol (SOAP) or other suitable protocols.

Figure 3:
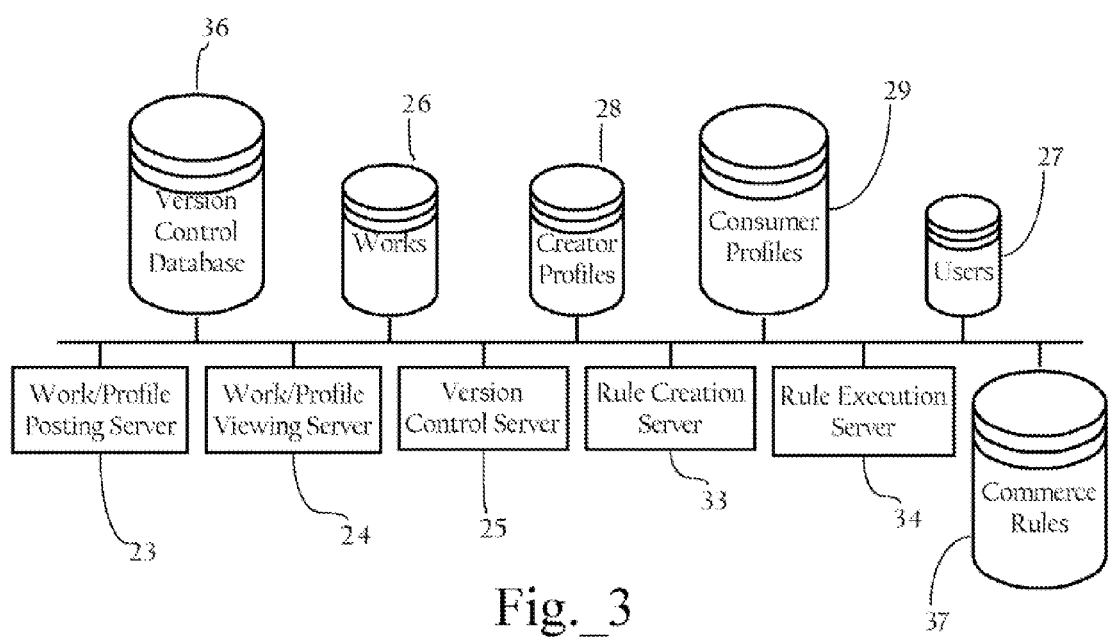
FIG. 3 is a schematic diagram illustrating functional modules and data stores of a marketplace system according to one implementation of the invention.

The physical servers 22 of marketplace system 20 can implement one to many of the following functional modules, illustrated in FIG. 3. For example, the functional modules of marketplace system 20 can include work/profile posting server 23, work/profile viewing server 24, version control server 25, rule creation server 33, and rule execution server 34. In one implementation, marketplace system 20 further comprises works data store 28, user data store 27, creator profile data store 28, consumer profile data store 29, version control data store 36, and commerce rules data store 37. Structurally, these data stores connote a large class of data storage and management systems. In particular implementations, works data store 26, for example, may be implemented by any suitable physical system including components, such as database servers, mass storage media, media library systems, and the like.

User data store 27 stores information relating to a plurality of user accounts. In some particular implementations, marketplace system 20 maintains user accounts for one or more users. For example, marketplace system 20 may maintain user accounts for content creator and consumers. For example, marketplace system 20 may maintain user accounts, storing user account information in user data store 27. User account information, in addition to a user name and password, may also include address and other personally identifying information and possibly financial account information (such as bank account and routing information which can be debited or credited, a credit card, a PayPal® account, a micro-payment account). User account information may also include other information such as user preferences, and tags describing one or more aspects of the user. A user account may also be associated with a creator profile stored in creator data store 28, and/or a consumer profile stored in consumer profile data store 29.

In some implementations, a user provides login or authentication information to gain access to his or her account information. A variety of authentication mechanisms can be used; as discussed above, a user name and password authentication mechanism is one suitable authentication scheme. To protect the initial login information, content aggregation and benefit attachment system 20, for example, may employ Secure Sockets Layer (SSL) or other encryption mechanisms (such as HTTP-S).

Creator profile data store 28 stores profile and other information for one or more content creators. In one implementation, a creator profile is stored in association with an underlying user account in user data store 27. Consumer profile data store 29 stores profile and other information for one or more content consumers. In one implementation, a consumer profile is stored in association with an underlying user account in user data store 27. In particular implementations, a profile includes one or more content acquisition rule sets that specify the conditions that trigger automated content acquisition, payment, and/or distribution workflows described herein. Commerce rules data store 37 stores one or more commerce rules configured by users of the system.

Works data store 26 stores information relating to a plurality of digital content objects registered on marketplace system 20. Works data store 26 can include the digital content objects themselves, or uniform resource locators (URLs) to the digital content objects. Works data store 26 may also store meta information of the digital content objects, such as tags and other attributes, characterizing one or more characteristics of the respective digital content objects. In one implementation, records corresponding to digital content objects also include identifiers corresponding to the creator entity that created, uploaded and/or owns, or purports to own, the legal and/or beneficial rights to the digital content object.

Particular embodiments of the present invention can involve multiple entities, each assuming one or more roles. For example, in one implementation, the marketplace mechanisms described herein may operate in connection with content creators, content consumers, and sponsors. In particular implementations, a given entity may assume more than one of these roles concurrently. An entity may be any suitable entity, such as an individual, a corporation, a partnership, a joint venture, and combinations of the foregoing.

A content creator is an entity that owns or purports to own the legal and/or beneficial rights to a given digital object, such as media content, computer code and the like. A content creator may have acquired rights in a given content item through creation of the content, or a purchase or other acquisition. Such rights may include copyrights and/or contractual rights. In some implementations, a content owner may be compensated as a result of distribution of a given content item to a content consumer. A content creator may comprise several individuals each having user accounts on marketplace system 20. A content consumer, in some implementations, is an entity that accesses digital content objects, and creates one or more commerce rules. A sponsor, in particular implementations, is an entity that sponsors one or more content creators in connection with the market place.

A.1.b. Content Hosting System

Content hosting system 40 is a network addressable system that hosts one or more digital content objects or other works accessible to one or more users over a computer network. In one implementation, content hosting system 40 may be an informational web site where users request and receive identified web pages and other content over the computer network. Content hosting system 40 may also be an on-line forum or blogging application where users may submit or otherwise configure content for display to other users. Content hosting system 40 may also be a content distribution application, such as Yahoo! Music Engine®, Apple® iTunes®, podcasting servers, that displays available content, and transmits content to users. In another implementation, content hosting system 40 may be a media aggregation or sharing system, such as Flickr® photo sharing site, and similar variants. In one implementation, the content hosting system 40 may include digital rights management and/or access control technologies to control distribution of digital content objects to authorized users.

As FIG. 1 illustrates, content hosting system 40 may comprise one or more physical servers 42 and a content data store 44. Content data store 44 stores content as digital content data objects. A content data object or content object, in particular implementations, is an individual item of digital information typically stored or embodied in a data file or record. Content objects may take many forms, including: text (e.g., ASCII, SGML, HTML, XML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 44 connotes a large class of data storage and management systems. In particular implementations, content data store 44 may be implemented by any suitable physical system including components, such as database servers, mass storage media, media library systems, and the like.

A.1.c. Client Nodes

Client node is a computer or computing device including functionality for communicating over a computer network. A client node can be a desktop computer 82, laptop computer, as well as mobile devices 84, such as cellular telephones, personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages 30 and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

A.2. Example Protocol Environment

The networked systems described herein can communicate over the network 60 using any suitable communications protocols. For example, client nodes 82, as well as various servers of the systems described herein, may include Transport Control Protocol/Internet Protocol TCP/IP networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context, may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment, may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

A.2. Example Computing System Architectures

The client and server host systems described herein can be implemented in a wide array of computing systems and architectures. The following describes example computing architectures for didactic, rather than limiting, purposes.

Figure 2:
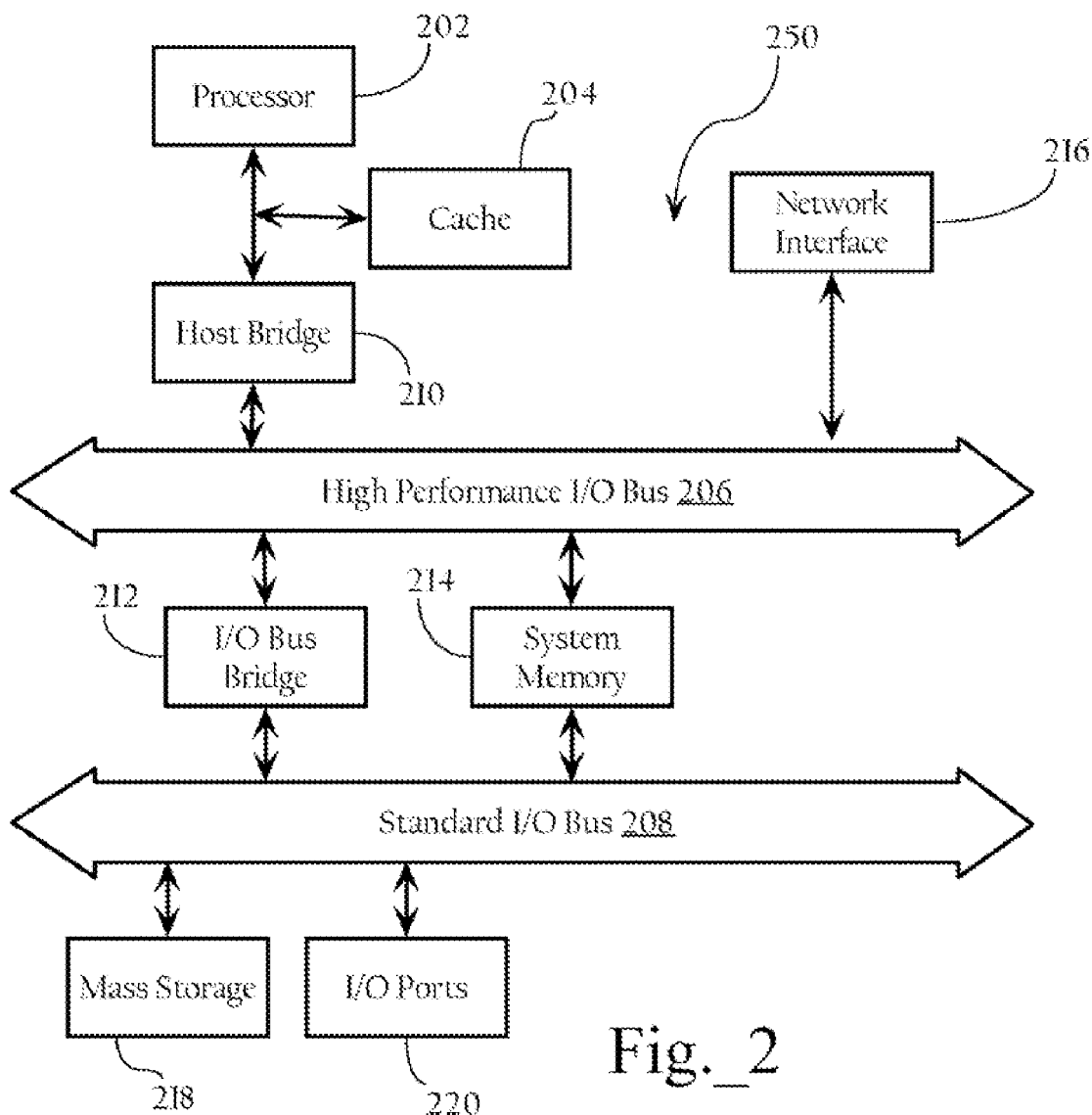
FIG. 2 is a schematic diagram illustrating an example computing system architecture that may be used to implement one or more physical servers.

FIG. 2 illustrates an example computing system architecture, which may be used to implement a physical server, such as server 22. In one embodiment, hardware system 200 comprises a processor 202, a cache memory 204, and one or more software applications and drivers directed to the functions described herein. Additionally, hardware system 200 includes a high performance input/output I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

B. Example Work Blows

The following illustrates example work and process flows according to one particular implementation of the invention.

B.1. Work and Creator Profile Posting

Figure 4:
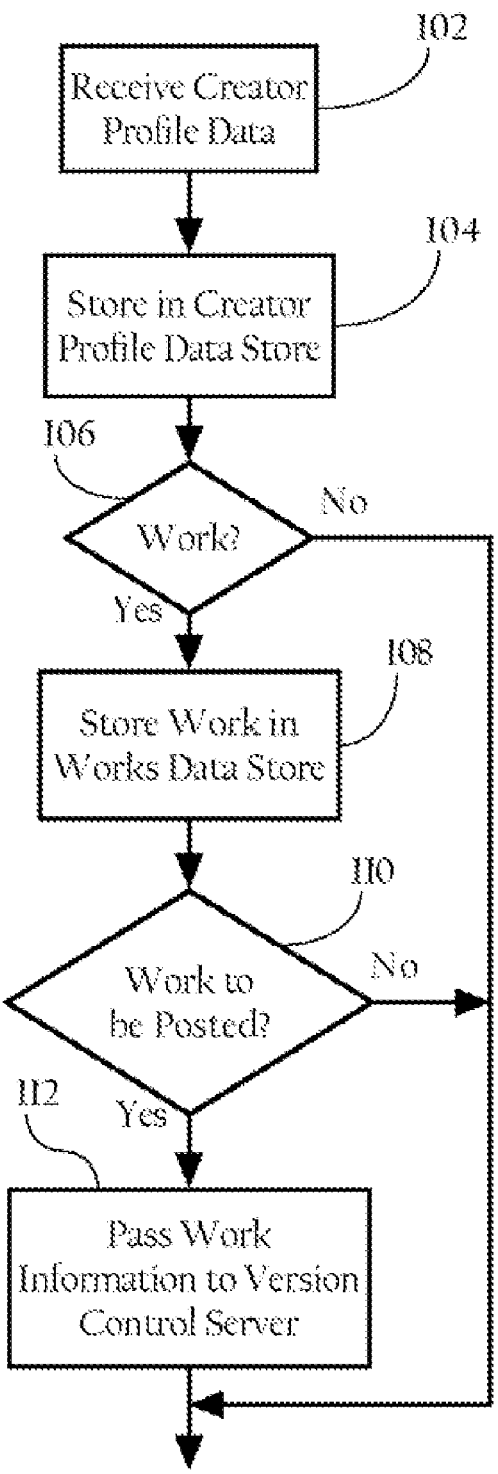

In one particular implementation, a content creator may access marketplace system 20 and configure a creator profile. FIG. 4 illustrates a work flow, according to one particular implementation, directed to creating and posting creator profiles and works. In one implementation, a user, using a client node 82 (for example) registers with marketplace system 20. In one implementation, the user configures a creator profile, which includes identifications of his or her current work(s) and one or more proposed works or projects. The creator profile may also include biographical information and a history of past works. The creator profile may also include one or more current projects, to which consumers may subscribe. For example, a creator may post a project describing how he or she regularly creates short stories involving political themes. Consumers could subscribe to the project and automatically receive and pay for the stories, pursuant to commerce rules, when the creator posts them.

In one implementation, the work/profile posting server 23 accepts the users creator profile and stores it in creator profile data store 28 (102, 104). If the user also configures a work (current or prospective) (106), the work/profile posting server 23 stores data describing the work in works data store 26 in association with an identifier corresponding to the user's creator profile (108). If the user elects to post the work and make it available (110), work/profile posting server 23, using a version control server 25, stores information relating to the work to a code database or a media database of works data store 26 depending on the type of work. The version control server 23, in one implementation, also writes work metadata to a version control database 36.

In a particular implementation, a user may post a work by accessing marketplace system 20 over computer network 60, or a LAN within the domain of marketplace system 20, with a client node 82, 84. In one implementation, a special-purpose client application may be used to post creator profiles and works on marketplace system 20. In another implementation, client computer 82 includes a browser or other client application that parses and displays Hyper-Text Markup Language (HTML) pages transmitted from marketplace system 20. In one implementation, marketplace system 20 may transmit a page-based interface including functionality allowing a user to select a work and upload it to marketplace system 20. Using the page-based interface, a creator may identify a data file embodying the work, and cause the data file to be uploaded to marketplace system 20. In another implementation, the creator may specify a uniform resource locator of a work hosted by a separate system, such as content hosting system 40.

The creator may also specify or configure one or more attributes of the work, such as terms of sale or license, distribution rights, and the like. For example, a creator may post a work and specify desired payment and use terms. In a particular implementation, the creator may specify one or more payment related attributes, such as a monetary or item value for the work. For example, a creator can charge a micropayment for each view of a blog post, or a monthly fee for access to the blog post. In one implementation, the creator can apply any funds attributable to views or other accesses of a work to an item that he wishes to purchase. For example, a creator may wish to purchase a new computer. The creator can configure the work posting to indicate this desire, and write a rule which states every blog post view contributes one penny towards the purchase of a laptop. In one implementation, another entity may elect to sponsor the work. For example, a user viewing tire work and tire stated goal to acquire a laptop may configure a rule that contributes a matching amount each time other users acquire the work. In another implementation, an entity, such as a laptop manufacturer can elect to sponsor the creator by offering a laptop to the creator at half price, where the cost of the system is paid from payments arising out of views of the blog post. In yet another implementation, the creator may specify that the subject work can be run against advertisements and indicate the terms under which the creator would like to be compensated, such as 1 cent per viewing, and the like.

The creator may also configure one or more tags, and possibly other attributes of the work. The tags associated with the work can vary considerably. The tags can relate to the subject of the work (subject, location, etc.), the circumstances involving creation of the work (date, author, time, image capture settings, etc.), and the like. Other data can be associated with the work. For example, the tags need not be entered by the user who uploaded the work. Rather, the tags or other information may be entered by other users after accessing and viewing the work. In addition, one or more tags can be automatically extracted based on analysis of the work. For example, the digital file including the underlying work, such as an image or video, may also include one or more tags in reserved data fields. Other information can include the data and time when the work was uploaded. In addition, if the work includes text, marketplace system 20, for example, can execute a programmatic process to extract one or more tags from the work. Still further, works may also be tagged with one or more geographical locations or geo-tags. Other tags or attributes of the work can also be recorded, such as a device that captured the data underlying the work (e.g., such as the camera used to capture an image), quality characteristics of the content (e.g., pixel resolution, color resolution, etc.), the author or creator of the image, and the like.

Still further, the creator profile may also include one or more project channels. A project channel is a description of a project, in which the creator engages either regularly or at various times. For example, a project channel can be created for a creator's blog. Another project channel can be created for the creator's music works. Yet another project channel, can be created for a computer code development project, such as widgets, mashups, utilities, macros, and other executables. As with works, the creator can configure one or more tags that facilitate user searches. The project channel can also specify the terms of sale, as well as other parameters. A project channel can also be configured to provide links to rule creation server 33 to start a commerce rule creation workflow for a user that clicks on link. One or more fields of the rule creation templates can be pre-populated based on the attributes of the project channel and/or creator profile.

B.1.a. Commerce Rules & Revenue Splitting

In one implementation, a creator, or multiple creators, can set up projects in such a way that the revenue generated from the project is shared in a manner specified by one or more commerce rules. As discussed above, a creator entity can include one or more user entities. When creator entity consists of one individual, payment is fairly straight forward—i.e., when payment comes from a source (direct, ad revenue sharing, or subscription), the payment goes to the creator. For creator entities that include groups of users, marketplace system 20, in one implementation, includes a project manager role. In one particular implementation, a project manager can be a creator, or simply a manager, who creates profiles, work descriptions and revenue share models. For example, a project manager of a film project may be the executive producer. The project manager, in one implementation, can configure a rule set which compensates contributors to a project on a rule based model which could include things like: time contribution, monetary contribution, equipment contribution, screenwriting etc. The project manager can configure rules defining how one or more contributing users share in the revenues generated by a given project. The rules may be manually configured and static, or dynamic and responsive to one or more events, for example, a project manager can set up a rule that defines a static sharing scheme where each contributing user receives a fixed percentage of generated revenues. Dynamic, automated rules could be based on the occurrence of one or more events, such as the number of postings of one contributing user relative to other contributing users, on time cards inputted by contributors, or by the relative amounts contributing users have directly funded the project. In addition, investors in a project can contribute and receive compensation via this system even if they are not creators. As an example, a project could be a film project. A project manager may configure a project channel for the film project in marketplace system 20 and post information indicating that the project manager is looking for contributors to join the project. Contributors could contribute anything from time and money to equipment and talent. Their eventual compensation could be tied back to their contributions when the film is finally made and purchased.

B.2. Work Acquisition Rules Configuration

Consumers may access marketplace system 20 to search for works, project channels, and/or creator profiles, and configure one or more work commerce rules as discussed more fully below. In one implementation, a work/profile viewing server 24 accesses work and creator profile data stores 26 and 28, respectively, as required to provide requested information to consumers.

When a consumer identifies a work, project and/or profile of a creator, in which the consumer is interested, he or she may create a commerce rule directed to automatically acquiring and paying for future works of the creator. For example, a consumer may access a rule creation server 33 in order to create a commerce ride. The commerce rule, in one implementation, specifies the conditions under which the consumer desires to acquire future works of the creator, and includes parameters directed to paying for the work. The rule creation server 33 may step the consumer through a commerce rule creation workflow comprising one or more rules template pages. Interacting with rule creation server 33, a consumer may work through the templates to configure a commerce rule whereby the consumer subscribes to a project channel. In other implementations, the consumer may configure a commerce rule independent of a project channel and configure a rule based on one or more desired attributes.

As discussed above, a commerce rule can be based on a variety of attributes. For example, a commerce rule can be constructed based on the following elements: 1) tags, 2) price, 3) distribution terms, 4) project channel, and 5) creator profile. In addition, the commerce rule also indicates how the consumer will pay for the work. For example, the consumer may specify a financial account, debit account, credit card, or micropayment account. The consumer may also specify one or more expiration conditions for the commerce rule, such as a threshold period of time, an aggregate monetary amount, or an aggregate number of purchases. The consumer may also specify a threshold price below which an automatic purchase is made. In one implementation, if the price is over the configured threshold, the commerce rule can be configured to automatically notify the consumer of the new work and provide an opportunity to acquire it. Still further, commerce rules can also be based on other attributes, such as an editorial rating, a peer-review rating and the like. For example, a consumer may create a commerce rule that automatically acquires any politics-related video that has a minimum of ten peer reviews, and a minimum average peer-reviewed rating. In some particular implementations, marketplace system 20 can also support a ratings system that allows consumers to rate and provide feedback on creators. Commerce rules can also be configured to include threshold feedback ratings as well. Commerce rules data store 37 can also be searchable to allow creators to see what is in demand.

As discussed above, the rule creation server 33 also allows the user to set up a payment mechanism over the internet in order to automatically purchase works as they are created. The server at #108 can connect to external payment sources (#113) such as PayPal, credit card transaction processors, banks etc. in order to have a conduit to pay for work automatically as it is produced an posted to marketplace system 20. When the consumer has configured the rule, rule creation server stores the commerce rule in a rides data store 37 in association with a profile associated with the consumer.

Figure 5:
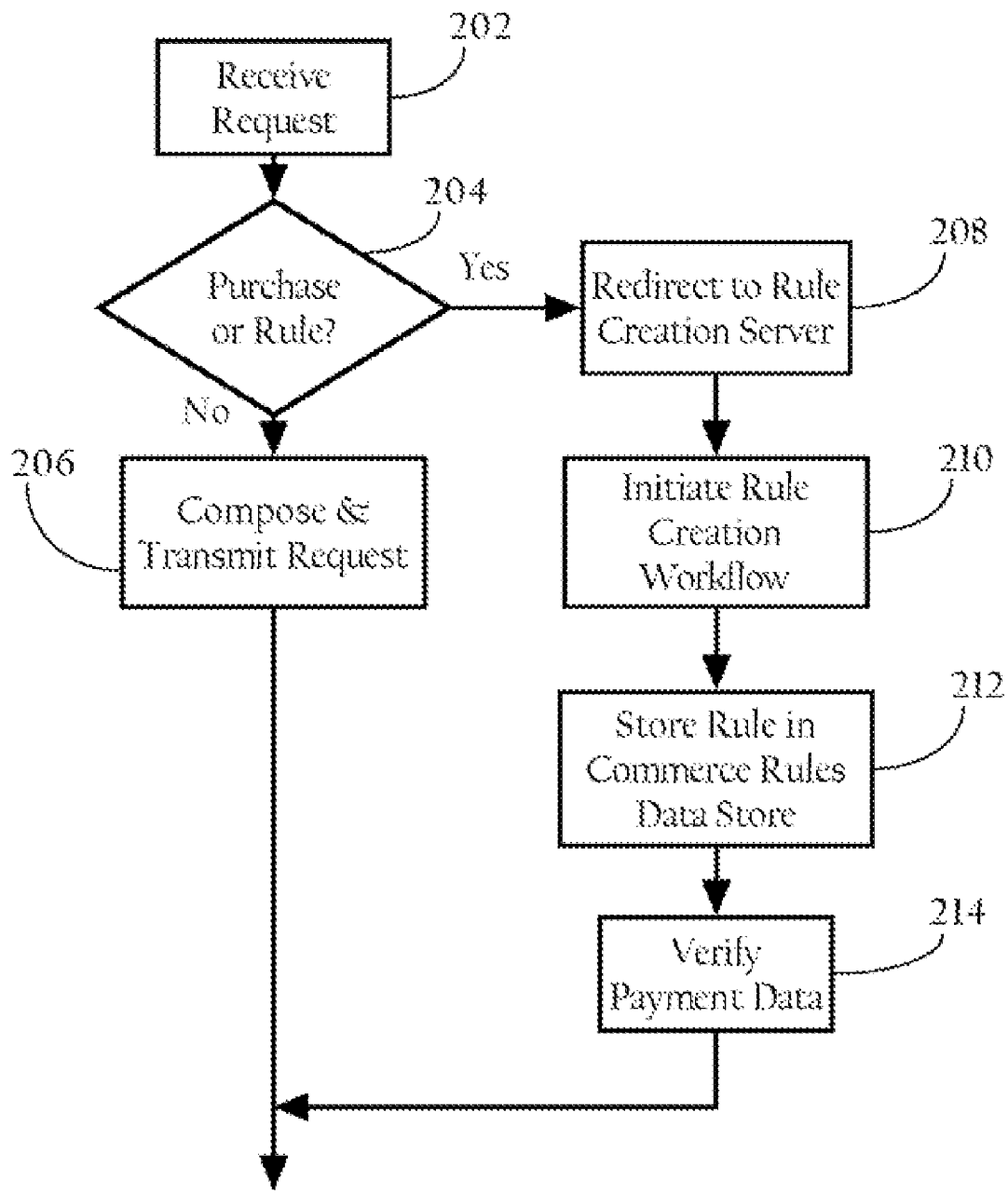

One particular implementation of the invention implements the following operational and work flows. As FIG. 5 illustrates, in one implementation, as a consumer navigates marketplace system 20 for works, project channels and profiles, work/profile viewing server 24 accesses one or more of the data stores described above to provide requested information (202, 206). When a consumer locates a desired project channel or work, or otherwise desires to create a commerce rule (204), work/profile viewing server 24, in one implementation, redirects the consumer to rule creation sewer 33 (208). The rule creation server 33 executes a rule creation work flow and stores a completed commerce rule in commerce rules data store 37 (210, 212). In one implementation, rule creation server 33 may also verify the payment information provided by the consumer (such as pre-authorizing a transaction on a credit card account) (214). If a verification error is generated, rule creation server 33 can notify the consumer.

Rule Execution

In one implementation, when a creator posts a new work to marketplace system 20, rule execution server 34 processes the work posting against one or more commerce rules in commerce rules data store 37. For example, in one implementation, mile execution server 34, when invoked in response to a work posting (302), accesses commerce rules data store 37 and applies one or more attributes of the work against the rules in commerce rule data store 37 to detect whether the work satisfies one or more commerce rules (304). For one or more identified rules (306), rule execution server 34 determines whether automatic payment conditions have been satisfied (308). If so, rule execution server 34 initiates an automatic payment transaction wherein the work is acquired for the consumer identified in the commerce rule (310). In one implementation, rule execution server 34 obtains a copy of the work from version control server 25, and purchases the work using payment information in the consumer's profile or as configured, in the commerce rule itself. In one implementation, rule execution server 34 also notifies the consumer either of the purchase (if the automatic payment rules were satisfied), or of the work posting (if notification rules were satisfied) (312). As discussed above, a purchase may result in distribution of compensation to a single entity or multiple entities based on a set of revenue sharing rules.

B.4. Example Use Scenarios

The following example illustrates one possible use scenario enabled by particular implementations of the invention. Assume for didactic purposes that a creator produces political music videos, and develops open source software. The creator registers on marketplace 20 and configures a profile. The creator adds a political music videos to the system 20, and indicates in a project channel that the uploaded work is the first of a series of political videos that lie plans to produce. The creator indicates that future works in this the project channel will be available for 1 cent per view or 1 dollar a month for unlimited plays. The creator also configures his profile to add information about his video production skill set and his contract rates.

The creator may also add source or binary code object to the marketplace system 20. For example, the creator may have three code development projects in which be is engaged. One project may be a mobile-phone-based application, for which the creator uploads new versions about once a week. A second application may be a calendar application, to which he makes updates approximately once a month. A third project may involve a collaborative effort, which is lead by the creator and also involves twelve other contributing developers.

A consumer, looking for political videos, may find the creator's posted video on marketplace system 20 and sample the currently posted video. The consumer enjoys the video, contributes a small amount to the creator via PayPal and subscribes to the creator's project channel. In one implementation, this involves creating a commerce rule, wherein whenever the creator generates and posts a new political video to the project channel, the consumer automatically purchases a view of the video. In one implementation, the fee for the purchase of the video automatically gets transferred from the consumer's account to the creator's account. The marketplace system 20 may also notify the consumer of the purchase and provide a link to the video.

A second consumer, looking for a calendar application, locates the creator's uploaded calendar application. The second consumer is also a registered creator on marketplace system 20. In one implementation, the second consumer creates a commerce rule that directs income from the second consumer's blog postings, podcasts and open source software releases to a fund to be used to pay for the calendar application. When sufficient funds exist, the rule execution server 34 automatically acquires the latest calendar application and notifies the second consumer.

Marketplace system 20 also allows consumers to purchase the distribution or other licensing rights to the video, such as rights to use, remix, mashup, publicly display, and the like. In some particular implementations, this occurs automatically as part of the rule based commerce system. For example, the consumer can set up a rule to automatically purchase one personal view of the video, plus distribution rights of the video to one or more additional users identified by the consumer. For example, the consumer may have a group of friends who enjoy political videos. The consumer sets up a rule to auto purchase videos as the creator posts them. In addition, the consumer may also have a web site which will redistribute the videos purchased from the creator, and will run ads alongside these political videos for monetary gain. The creator may benefit from any monies generated by this video if they have requested "ad revenue share rights" when provider posts the video. In this example, a provider can post a video for a $X amount paid distribution, or for $X/2 paid distribution if there is an included revenue share application.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method, comprising:
  receiving, by the computing device, from a consumer, user-defined commerce rule information relating to a user commerce rule, the user-defined commerce rule information comprising a matching attribute and an automatic payment condition, the matching attribute identifying a project channel associated with a creator entity;
  creating, by the computing device, using the user-defined commerce rule information, a user commerce rule comprising the matching attribute and the automatic payment condition;
  storing, by the computing device, the created user commerce rule in a network addressable and searchable commerce rule data store;
  receiving, by the computing device, from the creator entity, work information identifying a work of the creator entity, the information indicating the work is associated with the project channel;
  matching, by the computing device, the work information to the matching attribute of the created user commerce rule, such that the matching attribute identifying a project channel matches the project channel indicated in the work information;

determining, by the computing device, that the automatic payment condition of the created user commerce rule has been satisfied; and automatically purchasing, based on the matching and determining steps by the computing device, from the creator entity, the work of the creator entity for the consumer.

2. The method of claim 1 further comprising:

receiving, by the computing device, a digital object corresponding to the work; and storing, by the computing device, the digital object in an object data store.

3. The method of claim 1 further comprising receiving, by the computing device, a subscription to the project channel from the consumer, such that works posted to the project channel are automatically purchased, by the computing device, from the creator entity for the consumer.

4. The method of claim 3 wherein the subscription additionally defines a condition operative to control automatic purchases of works posted to the project channel.

5. The method of claim 3 wherein the subscription additionally defines a purchasing attribute operative to automatically purchase works posted to the project channel for an additional consumer.

6. The method of claim 1 wherein the project channel identifies a plurality of contributing creators, and comprises a rule defining a revenue sharing scheme between the plurality of contributing creators.

7. The method of claim 1 wherein the project channel additionally comprises project channel information comprising a tag having a tag value that is used to identify the project channel in a user search of available project channels using the tag value.

8. The method of claim 1 wherein the project channel additionally comprises project channel information comprising a term of sale of works associated with the project channel, such that the purchasing of the work of the creator entity for the consumer is according to the term of sale.

9. The method of claim 1 wherein the project channel additionally comprises project channel information comprising a commerce rule creation workflow that, when selected, prepopulates a commerce rule creation template based on attributes of the project channel and the creator entity.

10. An apparatus comprising:

a processor;

a storage medium for tangibly storing thereon program logic for execution by the processor, the program logic comprising:

rule information receiving logic executed by the processor for receiving, by from a consumer, user-defined commerce rule information relating to a user commerce rule, the user-defined commerce rule information comprising a matching attribute and an automatic payment condition, the matching attribute identifying a project channel associated with a creator entity;

rule creating logic executed by the processor for creating, using the user-defined commerce rule information, a user commerce rule comprising the matching attribute and the automatic payment condition;

rule storing logic executed by the processor for storing, by the computing device, the created user commerce rule in a network addressable and searchable commerce rule data store;

work information receiving logic executed by the processor for receiving work information from the creator entity identifying a work of the creator entity, the information indicating the work is associated with the project channel;

rule matching logic executed by the processor for matching the work information to the matching attribute of the created user commerce rule, such that the matching attribute identifying a project channel matches the project channel indicated in the work information;

payment condition logic executed by the processor for determining that the automatic payment condition of the created user commerce rule has been satisfied; and purchasing logic executed by the processor for automatically purchasing, based on said matching and determining steps, from the creator entity, the work of the creator entity for the consumer where the set of matching attributes match the work of the creator entity.

11. The apparatus of claim 10 further comprising:

digital object receiving logic executed by the processor for receiving a digital object corresponding to the work;

digital object storing logic executed by the processor for storing the digital object in an object data store.

12. The apparatus of claim 10 further further comprising:

subscription information receiving logic executed by the processor for receiving a subscription to the project channel from a consumer, such that works posted to the project channel are automatically purchased, by the computing device, from the creator entity for the consumer.

13. The apparatus of claim 12 wherein the subscription additionally defines a condition operative to control automatic purchases of works posted to the project channel.

14. The apparatus of claim 12 wherein the subscription defines a purchasing attribute operative to automatically purchase works posted to the project channel for an additional consumer.

15. The method of claim 10 wherein the project channel identifies a plurality of contributing creators, and comprises a rule defining a revenue sharing scheme between the plurality of contributing creators.

16. Computer readable storage media for tangibly storing thereon computer readable instructions that when executed by one or more processors implement a method comprising:

receiving, by the computing device, from a consumer, user-defined commerce rule information relating to a user commerce rule, the user-defined commerce rule information comprising a matching attribute and an automatic payment condition, the matching attribute identifying a project channel associated with a creator entity;

creating, by the computing device, using the user-defined commerce rule information, a user commerce rule comprising the matching attribute and the automatic payment condition;

storing, by the computing device, the created user commerce rule in a network addressable and searchable commerce rule data store;

receiving, by the computing device, from the creator entity, work information identifying a work of the creator entity, the information indicating the work is associated with the project channel;

matching, by the computing device, the work information to the matching attribute of the created user commerce rule, such that the matching attribute identifying a project channel matches the project channel indicated in the work information;

determining, by the computing device, that the automatic payment condition of the created user commerce rule has been satisfied; and automatically purchasing, based on the matching and determining steps by the computing device, from the creator entity, the work of the creator entity for the consumer.

17. The apparatus of claim 10 wherein the project channel additionally comprises project channel information comprising a tag having a tag value that is used to identify the project channel in a user search of available project channels using the tag value.

18. The apparatus of claim 10 wherein the project channel additionally comprises project channel information comprising a term of sale of works associated with the project channel, such that the purchasing of the work of the creator entity for the consumer is according to the term of sale.

19. The apparatus of claim 10 wherein the project channel additionally comprises project channel information comprising a commerce rule creation workflow that, when selected, prepopulates a commerce rule creation template based on attributes of the project channel and the creator entity.

* * * * *